United States Patent [19]
Akeel et al.

[11] Patent Number: 5,423,648
[45] Date of Patent: Jun. 13, 1995

[54] METHOD AND SYSTEM FOR QUICKLY AND EFFICIENTLY TRANSFERRING A WORKPIECE FROM A FIRST STATION TO A SECOND STATION

[75] Inventors: Hadi A. Akeel, Rochester Hills; Chris K. Reed, Oxford, both of Mich.

[73] Assignee: FANUC Robotics North America, Inc., Auburn Hills, Mich.

[21] Appl. No.: 823,206

[22] Filed: Jan. 21, 1992

[51] Int. Cl.⁶ ............................................. B65H 5/12
[52] U.S. Cl. .................................. 414/225; 414/719; 414/733; 414/917; 414/786; 901/48
[58] Field of Search ............... 414/225, 719, 917, 733, 414/786; 901/15, 48, 29, 40

[56] References Cited

U.S. PATENT DOCUMENTS

| | | | |
|---|---|---|---|
| 3,262,593 | 7/1966 | Hainer | 901/15 X |
| 3,402,911 | 9/1968 | O'Neill | 414/917 X |
| 4,283,764 | 8/1981 | Crum et al. | 901/48 X |
| 4,589,819 | 5/1986 | Shirao | 414/225 X |
| 4,695,027 | 9/1987 | Lindholm et al. | 901/42 X |
| 4,801,235 | 1/1989 | Rauschdorf | 414/225 |

FOREIGN PATENT DOCUMENTS

| | | | |
|---|---|---|---|
| 1217651 | 3/1986 | U.S.S.R. | 414/917 |
| 1548030 | 3/1990 | U.S.S.R. | 414/917 |

*Primary Examiner*—Donald W. Underwood
*Attorney, Agent, or Firm*—Brooks & Kushman

[57] ABSTRACT

A method and system are provided for quickly and efficiently transferring a workpiece from a first work station including a first sheet metal press to a second sheet metal press by providing a pendulum-type robot, including an arm assembly mounted on a support structure to swing about a first axis located above and between the first and second presses. The arm assembly not only swings about a first axis but also rotates about a second axis orthogonal to the first axis and a third axis which is orthogonal to the second axis. During swinging movement of the arm assembly about the first axis, rotation of the arm assembly about the second and third axes allows a center of gravity of the workpiece to follow a substantially straight line path between the first and second presses. The arm assembly includes first and second four-bar linkages, which are pivotally connected together to rotate about the second axis. Preferably, a wrist mechanism is provided to permit rotation of the part between the presses. Also preferably, a counterbalance mechanism in the form of a cable balancing device is provided to support the arm assembly against gravity.

31 Claims, 5 Drawing Sheets

METHOD AND SYSTEM FOR QUICKLY AND EFFICIENTLY TRANSFERRING A WORKPIECE FROM A FIRST STATION TO A SECOND STATION

TECHNICAL FIELD

This invention relates to methods and systems for quickly and efficiently transferring a workpiece from a first station to a second station and, in particular, to methods and systems for quickly and efficiently transferring a workpiece from a first work station to a second work station utilizing a pendulum-type robot.

BACKGROUND ART

Dual-axis load/unload robots, such as illustrated in FIGS. 1A and 1B, are the traditional and most widely used automation for press to press transfer. This type of automation has a minimum of two axis of motion and a third linear slide used to move the entire unit out from between the presses for die changeover or maintenance. A first axis gives the arm its vertical motion to lift or lower the part. A second axis gives the arm its horizontal motion in and out of the press. The axis motion can be programmable, but in most cases the axes are non-programmable.

The non-programmable models use hard stops for the different positions and the stops must be repositioned for each different part set up. A robot mounting frame 11 attaches to a linear slide which mounts onto the front or back of each press. This type of robot must have a part transfer station including a part transfer unit having a shuttle or a conveyor between the presses to transfer the part from the unload robot to the load robot.

With such dual-axis load/unload robots, a part/blank P is presented to a load robot 10 by a destacker unit (not shown), as illustrated in FIGS. 1A and 1B. After a press, generally indicated at 12, completes its cycle (with its dies 14 in an up position), an unload robot 16 moves to a position 18 and picks up part P. At the same time, the robot 10 has picked up another part/blank at the destacker and has moved to a position 20. As the robot 16 retracts out of the press 12 to a position 24, the robot 10 extends in and releases the part/blank at the position 18. The robot 10 retracts clear and the press 12 cycles. The robot 16 drops the part P onto a nest 26 of a part transfer unit, generally indicated at 28, at the position 24 and the part P is then shuttled to the next press, generally indicated at 30, at a position 32. A robot 34 picks up the part P at the position 32 and is ready to load the press 30. A robot 36 picks up the part P in the press 30 at a position 38 and retracts. Then, the part P is loaded into the press 30 in the same manner as described with respect to the press 12.

When a different part is to be run on the press line all the dies such as dies 14 and 22 of the press 12 and 40 and 42 of the press 30 must be removed and different dies set in the presses 12 and 30. This process must be performed as quickly as possible, so that the press line can be put back into production. To accommodate this process, the robots 10, 16, 34 and 36 and the part transfer unit 28 are typically mounted to slide units or tracks such as slide units 44 and 46 and track 48. This allows for quicker removal and replacement of the equipment from a die change area 33. Once the new dies are set, the robot positions, tooling, and part transfer nest 26 must be manually adjusted before production can begin.

Such systems have the following features:
Each robot has minimum two axis of motion;
Robots mount to the front or back of the press;
Three mechanisms are required to transfer parts between two presses: loader robot, unloader robot and part transfer station;
- Parts are transferred between the presses by a shuttle or conveyor;
- Non-programmable or programmable axis motion available; and
- Slides or tracks are used to move (3) mechanisms out of the die change area.

Such systems having the following shortcomings:
- Relatively expensive;
- Multiple units required between each press;
- Mechanisms must be moved out from between the presses for die changeover;
- Removal, replacement, and calibrating these mechanisms after a change significantly increases the part/die changeover time; therefore, the press line productivity is reduced;
- Limited flexibility to adapt to changes in the part and die shapes or locations;
- Any changes in part orientation is done on the part transfer unit; and
- Part quality is reduced because of the number of times the part is handled.

Swing arm robots, such as illustrated in FIGS. 2A and 2B are also used in press-to-press applications that require more flexibility and where only one mechanism between the presses is desired. This type of automation consists of a standard six axis robot 50 mounted to an auxiliary swing arm 52. The addition of the swing arm 52 allows the standard robot 50 to reach the large center-to-center distances of most press lines. The robot 50 is typically a standard six axis articulated arm robot. The robot 50 mounts to the swing arm 52 which transports it back and forth between two presses, generally indicated at 54 and 56. The robot 50 is programmable and has a high degree of flexibility to accommodate the variation in parts or die positions. The swing arm 52 is typically mounted to a slide or track 58 which allows the robot 50 and the swing arm 52 to be manually moved out from between the presses 54 and 56 during die changeover.

With such a swing arm robot 50, a part/blank P' is presented to a robot 60 by a destacker unit (not shown) as illustrated in FIGS. 2A and 2B. After the press 54 completes its cycle (with its die 62 in an up position), the robot 50 moves to a position 64 and picks up the part P'. At the same time, the robot 60 has picked up a part/blank at the destacker unit and has moved to a position 66. As the robot 50 retracts out of the press 54 to a position 68, the robot 60 extends in and releases the part/blank P' at the position 64. The robot 60 retracts clear and the press 54 cycles. The swing arm 52 rotates clockwise as the base of the robot 50 rotates counterclockwise (as shown in FIG. 2A) transporting the robot 50 and the part P' to a position 70. A robot 72 moves into the press 56 (at a position 74), picks up another part and retracts out of the press 56. The robot 50 proceeds to load the part P' into the press 56, in the same manner as described with respect to press 54. When the robot 50 finishes loading the press 56, the robot 50 moves back to the press 54 and repeats the sequence.

When a different part is to be run on the press line all the dies, such as dies 62 and 63 of the press 54 and the dies 76 and 78 of the press 56 must be removed and different dies set in the presses 54 and 56. This process must be performed as quickly as possible, so the press line can be put back into production. To accommodate this process, the swing arm 52 is typically mounted on the slide or track 58. This allows for quicker removal and replacement of the robot 50 from a die change area 71. Once the new dies are set, the robot 50 is repositioned between the presses 54 and 56 and their pickup and dropoff positions are reprogrammed before production can begin.

Such systems have the following features::
- Seven axis of motion;
- Standard six axis robot mounted to a swing arm axis;
- One robot required to transfer part between two presses;
- Robot mounts to the floor between two presses;
- Programmable axis motion with high flexibility; and
- Slides or tracks are used to move the robot out of the die change area.

Such systems have the following shortcomings:
- Relatively expensive;
- The swing arm axis motor or motors require high torque to enable it to move the heavy robot at high speed, press to press;
- Swing arm robots must be moved out from between the presses for die changeover;
- Removing and replacing these robots significantly increases the part/die changeover time; therefore, the press line productivity is reduced;
- The swing arm axis is redundant and requires special controls to accommodate;
- A minimum of six axes are required to transport the part, press to press;
- Seven axes are required for full flexibility; and
- Reliability is reduced due to the effects of high inertia on the standard robot's wrist axis.

The U.S. Pat. No. 4,695,027 to Lindholm et al. discloses a robot installation for use in a production line including at least one pendulum-type robot, including a primary arm and a secondary arm. A counterweight is displaceably arranged on the primary arm so that a center of gravity of the arm system lies on or is immediately proximate to the pivot axis independently of the position of the secondary arm on the primary arm.

SUMMARY OF THE INVENTION

The object of the present invention is to provide a method and system for quickly and efficiently transferring a workpiece from a first station to a second station utilizing a pendulum-type robot located above and between the first and second stations.

Another object of the present invention is to provide a method and system for quickly and efficiently transferring a workpiece, such as a sheet metal part, from a first work station, such as a press, to a second work station, such as another press utilizing a pendulum-type robot located above and between the first and second work stations.

Yet still another object of the present invention is to provide a method and system for quickly and efficiently transferring a workpiece, such as a sheet metal part, from a first work station, such as a press, to a second work station, such as a second press, utilizing a pendulum-type robot in which swinging motion from the first work station to the second work station and rotational movement of the robot about second and third axes of the robot cause a center of gravity of the workpiece to travel in a substantially straight line path between the first and second work stations.

In carrying out the above objects and other objects of the present invention, a system is provided for quickly and efficiently transferring a workpiece from a first work station to a second work station. The system includes a support structure and a robot supported on the support structure. The robot includes an arm assembly pivotally supported proximal a first end of the arm assembly to swing about a first axis located above and between the first and second work stations. The system also includes an end effector supported on a second end of the arm assembly distal the first axis to pick up the workpiece at the first work station and place the workpiece at the second work station. The arm assembly swings from the first work station to the second work station about the first axis, at least partially under the action of gravity.

Still further in carrying out the above objects and other objects of the present invention, a method is provided for quickly and efficiently transfer a workpiece from a first work station to a second work station. The method includes the steps of providing a support structure and providing a robot including an arm assembly rotatable about the first, second and third axes. The second axis is oblique to both the first and third axes. A robot is supported on the support structure so that the arm assembly is located at a position above and between the first and second work stations to swing from the first work station to the second work station about the first axis at least partially under the action of gravity. The method also includes the steps of providing an end effector on the arm assembly, swinging the arm assembly about the first axis to the first work station and utilizing the end effector to pick up the workpiece at the first work station. Then the method includes the steps of swinging the arm assembly from the first work station to the second work station while rotating the arm assembly about the second and third axes during the step of swinging the arm assembly from the first work station to the second work station to allow a center of gravity of the workpiece to follow a substantially straight line path between the first and second work stations. Finally, the method includes the step of utilizing the end effector to place the workpiece at the second work station.

Preferably, the system includes a counterbalance mechanism attached to the arm assembly so that the amount of torque required to swing the arm assembly at each of the first and second work stations is substantially reduced. Also, preferably, the counterbalance mechanism is a cable balancing device, including a tension cable for supporting the arm assembly.

Further, preferably, at least one of the work stations includes a press having a pair of opposing dies and wherein the workpiece is a sheet metal part.

The advantages of the method and system of the present invention are numerous. For example, parts can be transferred between the work stations quickly and efficiently by utilizing small torque motors for the robot, which is consequently lighter to allow faster cycle times and, hence, higher productivity. Also, die changeover is a relatively simple matter requiring relatively little time, hence also increasing productivity of the presses.

The above objects, features and advantages are readily apparent from the following detailed descrip-

BRIEF DESCRIPTION OF THE DRAWING FIGURES

BEST MODE FOR CARRYING OUT THE INVENTION

System Description

Figure 3A:
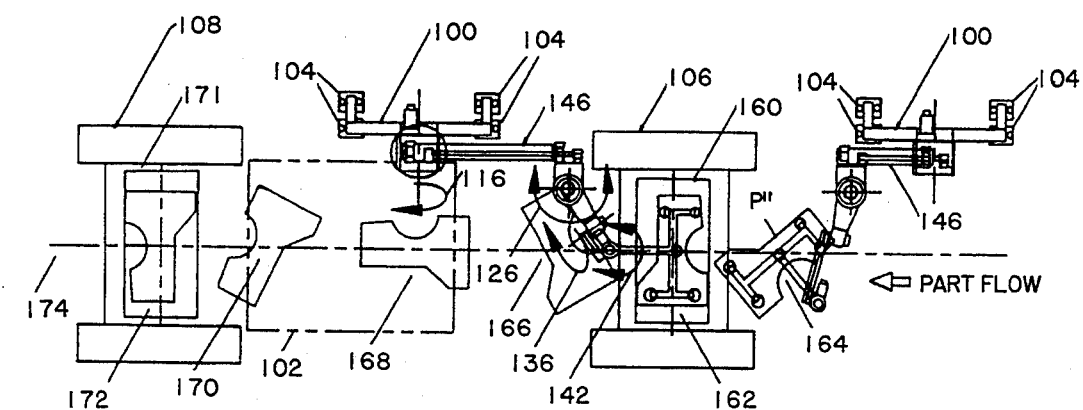
FIG. 3A is top plan view illustrating a method and system of the present invention utilizing a pendulum-type robot.
Figure 3B:
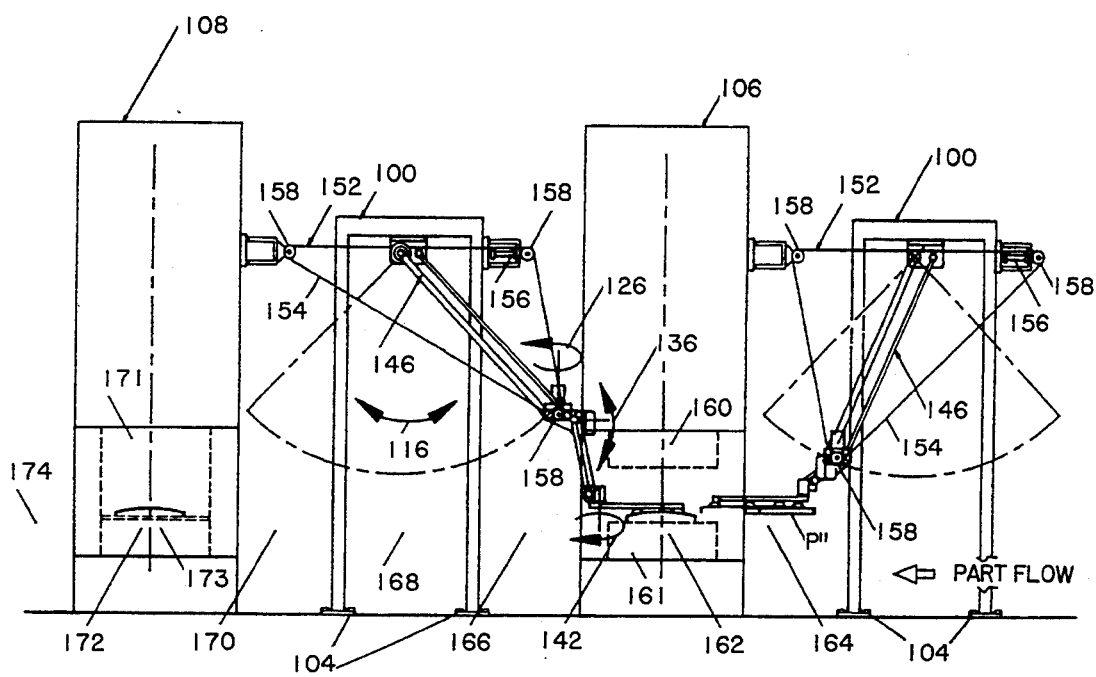
FIG. 3B is a side elevational view of the system of FIG. 3A.
Figure 5:
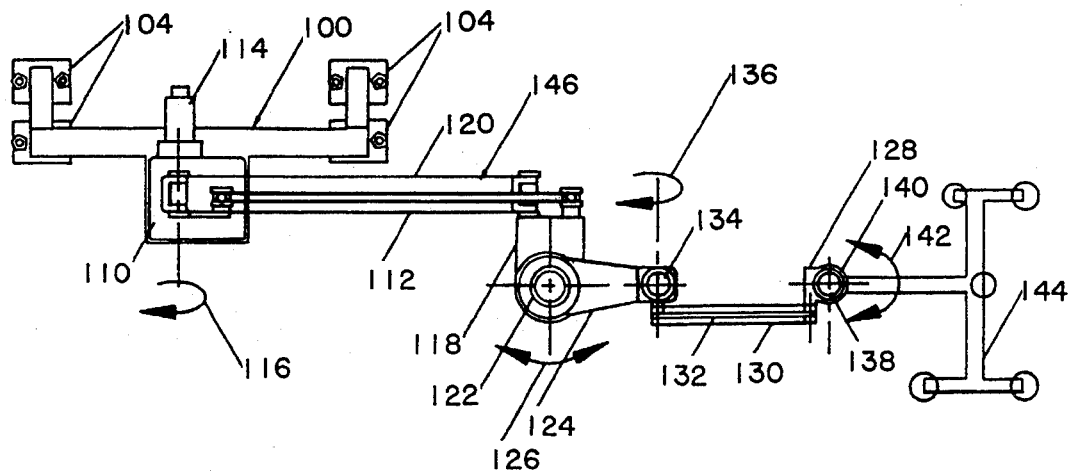
FIG. 5 is a top plan view of the pendulum-type robot and support structure of FIG. 4.
Figure 4:
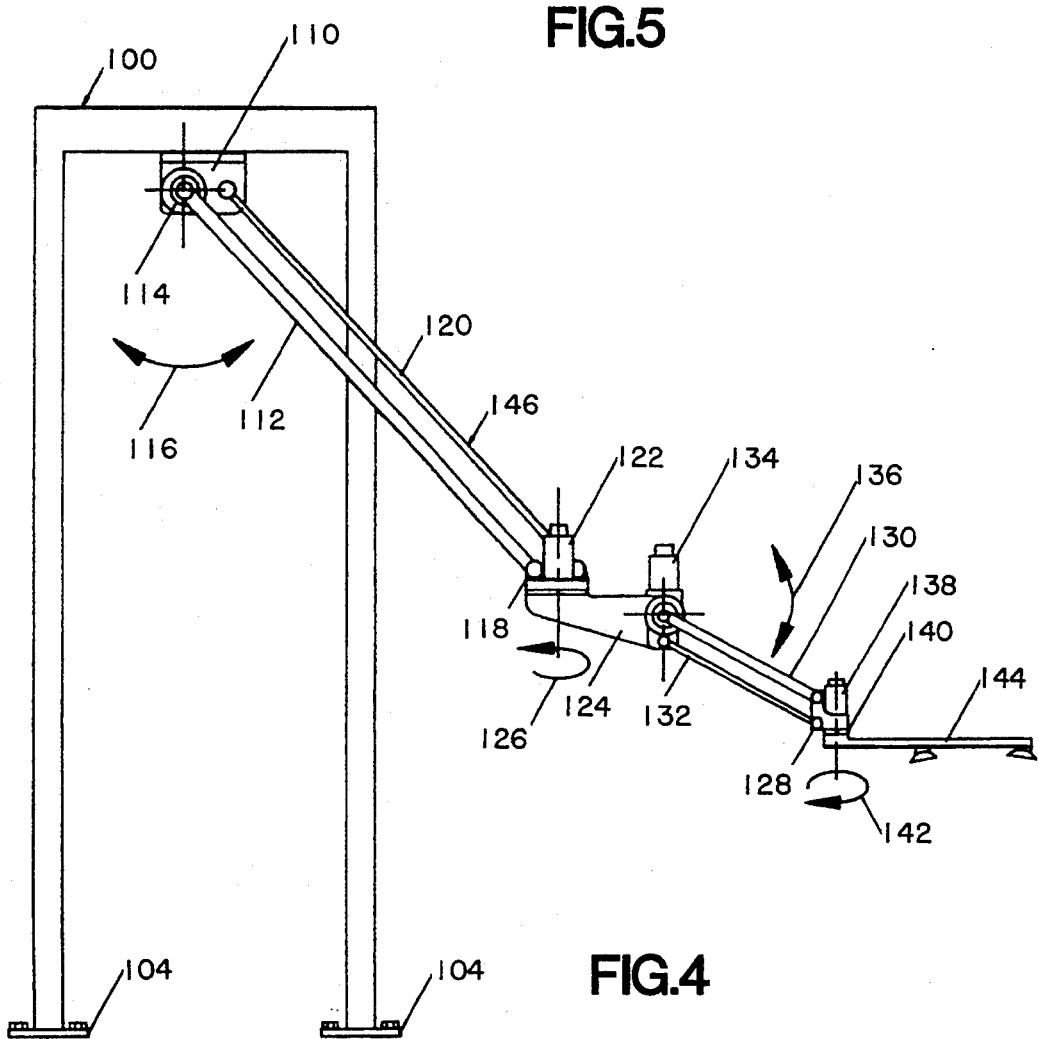
FIG. 4 is a side elevational view of the pendulum-type robot mounted on a support structure illustrating various axes of rotation and end effector, such as a gripper mounted on an arm assembly of the robot.

Referring to FIGS. 4 and 5, in combination with FIGS. 3A and 3B, a support frame, generally indicated at 100, is mounted to a floor outside of die change area 102 by brackets 104. Alternatively, the frame 100 can be mounted to the side frames of presses, generally indicated at 106 and 108, respectively.

As best shown in FIGS. 4 and 5, the support frame 100 carries a bracket 110 to which a robot pendulum arm 112 is pivoted at one end and rotates by means of a motor 114 about an axis, as indicated by arrows 116. The other end of the pendulum arm 112 is pivoted at a platform 118 which is kept in a fixed orientation, preferably horizontal, by means of an arm 120. The parts 110, 112, 118 and 120 form a four-bar linkage.

A motor 122 drives a link 124 in a pivoting rotation relative to the platform 118 about a second axis, as indicated by arrows 126. The link 124 is also coupled to a part 128 in a four-bar linkage arrangement by means of coupling links 130 and 132. The second axis 126 is generally oblique to the first axis 116 though, preferably, the second axis 126 is orthogonal to the first axis 116 and, also preferably, vertical.

A motor 134 rotates the link 130 in a vertical plane about another substantially horizontal axis, as indicated by arrows 136, to raise or lower the part 128.

A motor 138 rotates a part 140 relative to the part 128 about another substantially vertical axis, as indicated by arrows 142 to move an end effector or gripper 144 in a generally horizontal plane. Accordingly, a robot, generally indicated at 146, having four degrees of freedom is described. The motions of the robot 146 are controlled by means of a conventional programmable robotics controller (not shown).

This four-axis arrangement is sufficient to move the end effector or gripper 144 and an attached object or part P″ within the work envelope of the robot 146 while maintaining parallelism between the object and a fixed plane, preferably horizontal. This is usually sufficient for a majority of the press-to-press, or press-to-conveyor, transfer operations, especially those addressed by the prior art of FIGS. 1A and 1B.

Figure 2A:
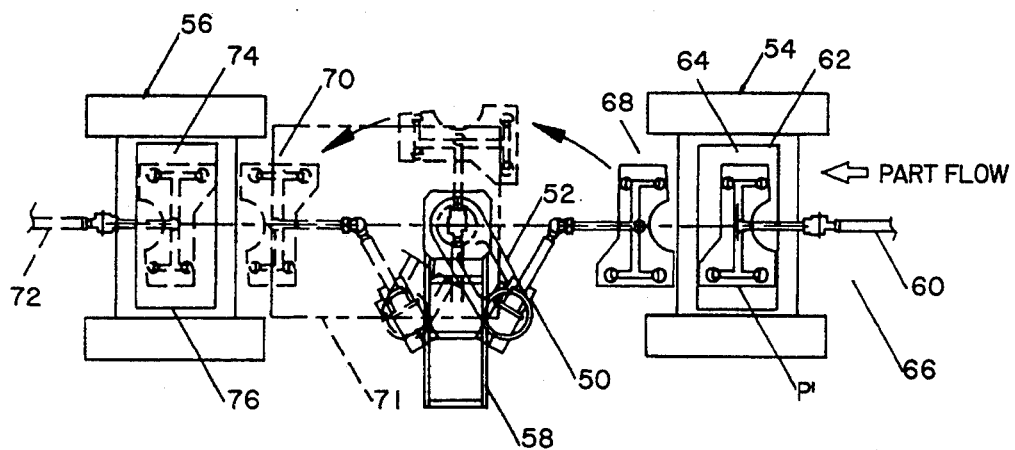
FIG. 2A is a second prior art top plan schematic view illustrating a swing arm robot system and also illustrating part flow and a die change area.
Figure 2B:
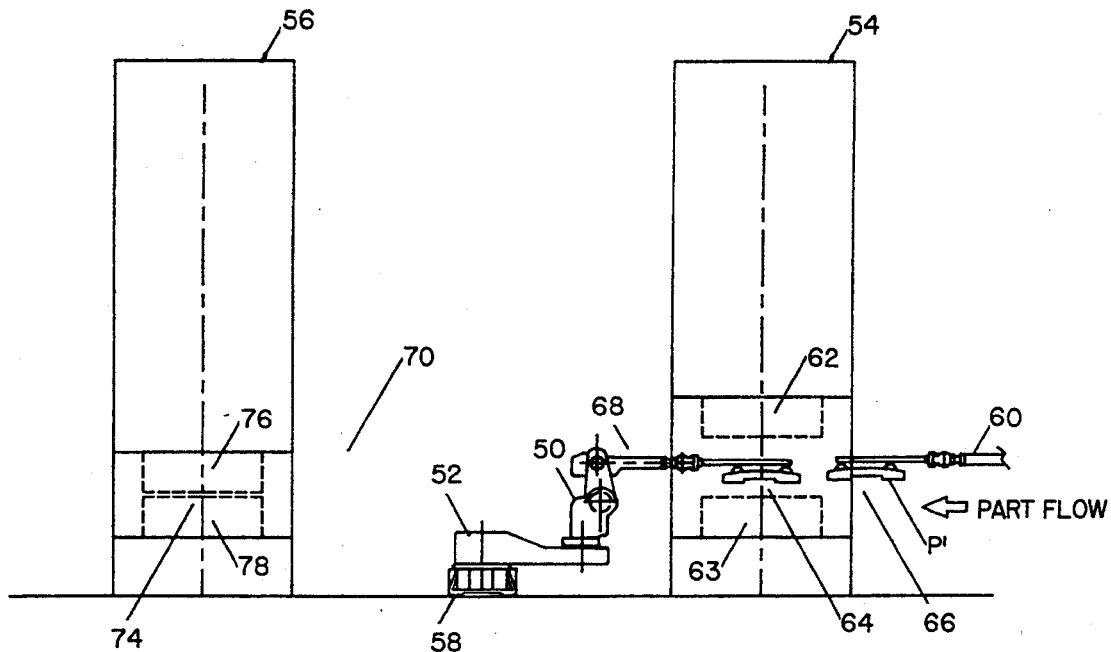
FIG. 2B is a side elevational view of the system of FIG. 2A.
Figure 6:
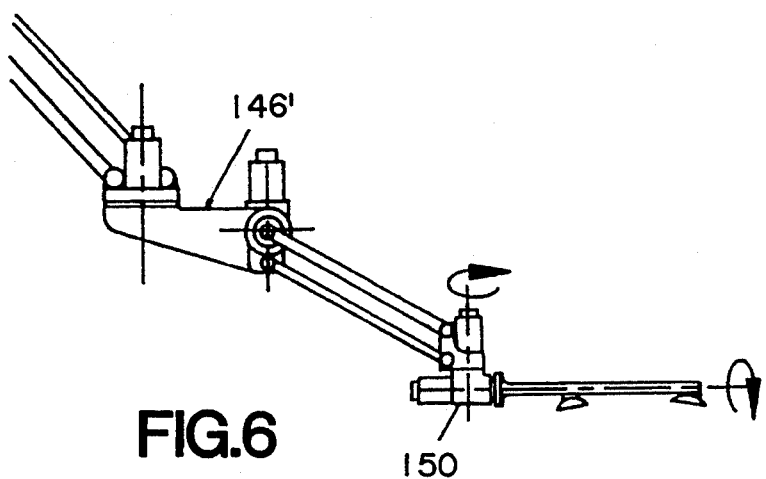
FIG. 6 is a side elevational view, partially broken away, of the arm assembly of FIG. 4 but modified to include a wrist mechanism having a pivotal axis of rotation.
Figure 7:
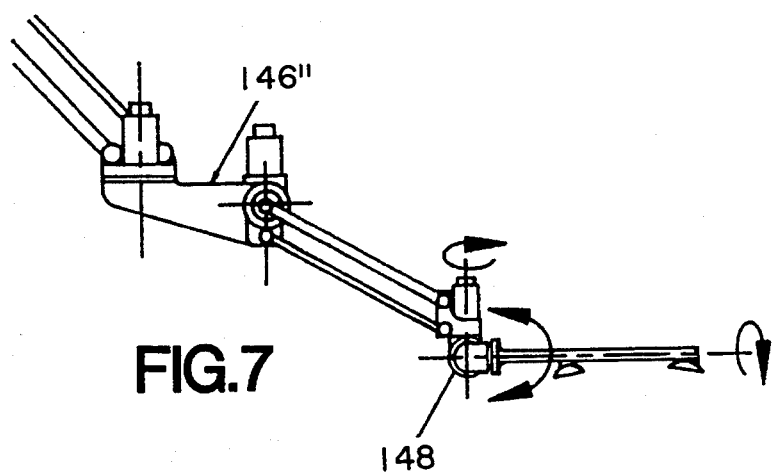
FIG. 7 is a side elevational view, partially broken away, of the arm assembly of FIG. 4, but modified to include a wrist mechanism having fifth and sixth axes of rotation to provide pitch and roll motions.

For the flexibility addressed by the prior art of FIGS. 2A and 2B, which may require rotation of the transferred object between two press locations, the robot 146 can be fitted at the part 140 with any type of robotic wrist mechanism having one or more degrees of freedom as shown in FIGS. 6 and 7 to obtain robots 146′ and 146″, respectively. Generally, a two-axis wrist 148 having two orthogonal axes with its first axis being orthogonal to a vertical axis is sufficient to allow the robot 146″ full flexibility for positioning and orienting an object in a three-dimensional space with six degrees of freedom, as shown in FIG. 7. A one-axis wrist 150 with its axis orthogonal to the vertical axis provides five degrees of freedom, as shown in FIG. 6.

In the other embodiment of FIG. 3B, the robot 146 is supported by a cable balancing device, generally indicated at 152. This cable balancing device 152 is used to balance gravity by means of a tension cable 154 that supports the robot arm assembly. The cable 154 is put under continuous tension by a cylinder 156 that compensates for the variation in cable length during pendulum motion. The cable 154 runs between pulleys 158. The two pulleys 158 are mounted to the support frame 100 or can be mounted to the presses 106 and 108. One of the pulleys 158 is mounted to a tension compensating cylinder, such as a cylinder 156, substantially close to the center of gravity of the arm assembly of the robot. By balancing gravity, motor torque required to drive the pendulum arm of the robot 146 is reduced. It is also possible to replace the lower pulley 158 by attaching the ends of the cable 154 to the platform 118.

Process and Method Description

Referring to FIGS. 3A and 3B, a part/blank P″ is presented to a first one of the robots 146 in the illustrated system by a destacker unit (not shown). After the press 106 completes its cycle (its die 160 in an up position), a second one of the robots 146 moves to a position 162 and picks up the part using its second horizontal axis, as indicated by arrows 136.

At the same time, the robot 146 has picked up a part/blank at the destacker and has moved to a position 164. As the second robot 146 retracts out of the press 106 to a position 166, the first robot 146 extends in and releases the part/blank at the position 162. The first robot 146 then retracts clear and the press 106 cycles.

The second robot 146 pivots about its first horizontal or pendulum axis, as indicted by arrows 116, to move the robot arm through a position 168, while rotation occurs clockwise about the first vertical axis, as indicated by arrows 126 and counterclockwise about the second vertical axis, as indicated by arrows 142, thereby transporting the part P″ to a position 170. This combination of axes motion allows the center of gravity of the part P″ to follow a path that approximates a straight line between the two presses 106 and 108. Any height adjustment from one press to the other is compensated by rotation about the second horizontal axis, as indicated by arrows 136.

A third pendulum-type robot (not shown) moves into the press 108 at position 172, picks up the part, and retracts to a position 174. Another part is then loaded into the press 108 by the second robot 146, in the same manner as described for the press 106. When the second robot 146 finishes loading the press 108, the second robot 146 moves back to the press 106 and repeats the sequence.

When a different part is to be run on the press line, all the dies, such as dies 160, 161 of the press 106 and the dies 171 and 173 of the press 108 must be removed and different dies set in the presses 106 and 108. This process must be performed as quickly as possible, so the press line can be put back into production. To accommodate this process, the second pendulum-type robot 146 moves to a preprogrammed rest position that is outside of the die change area 102. The second robot 146 and the support structure 100 do not have to be physically moved out from between the presses 106 and 108 because the vertically extending supports of the support structure 100 are located off to the side of the presses 106 and 108. This allows for the quickest die changeover because removal and replacement of the second robot 146 is not required. Once the new dies are set, the robots' pickup and dropoff positions are calibrated by reteaching a reference frame located on each die. This frame consists of a maximum of three points which can be located anywhere on the die. The method shortens the calibration and part setup time for the new part.

The method and system of the present invention have the following features:
- A minimum number of axes are used to transfer a part press-to-press;
- The basic unit consists of four axes of motion, with up to six axes available;
- Two additional wrist motions are available to add flexibility;
- One robot is required to transfer a part between two presses;
- The robot does not have to be removed from between the presses during die changeover;
- The robot mounts to an overhead support structure located off to the left or right side of the press line;
- The support structure can attach to the floor, ceiling, presses, or existing structural members;
- Programmable axis motion with high flexibility;
- The design focus is on moving the part, not a large robot, this allows smaller torque motors to be used;
- Electronic interface-to-press sensors, resolver or encoder mounted to the press ram to interlock programs, initiative cycle, and coordinate motion between the robots and the presses is possible; and
- These interfaces allow faster unload/load time in the press, hence the part throughput can be increased.

Figure 1A:
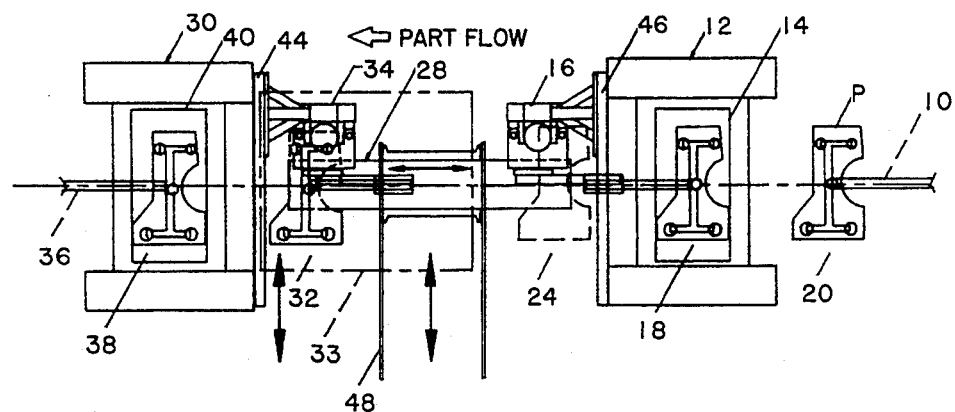
FIG. 1A is a top plan schematic view, illustrating a prior art, dual axis load/unload robot system; part flow and a die change area between two presses are indicated.
Figure 1B:
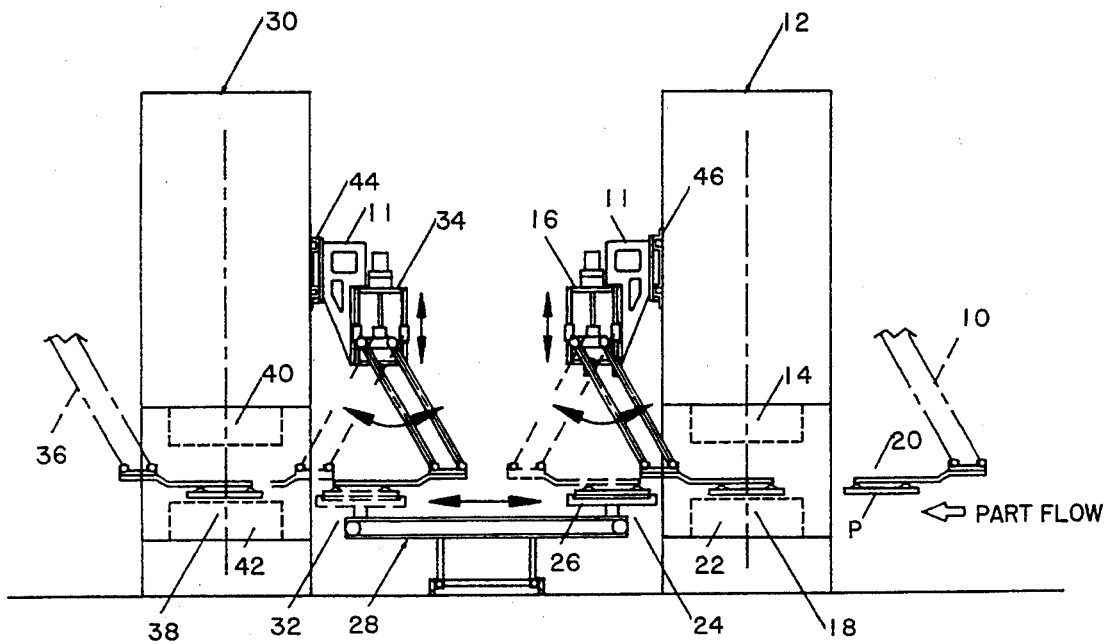
FIG. 1B is a side elevation view of the system of FIG. 1A.

The method and system of the present invention solve the shortcomings of the system of FIGS. 1A and 1B by:
- Lower cost by using one robot, instead of three mechanisms;
- The unique combination of axes allows the robot to be mounted off to the side of the press line;
- The robot does not have to be physically removed from between the presses for die changeover;
- The time for die changeover is shortened, hence productivity is increased;
- Calibration of the robot program to new dies after changeover is quicker with the use of reference frames;
- No tracks or slides required between presses;
- The basic four axes of motion allows the end effector/gripper to be oriented horizontally in X, Y and Z directions;
- Higher quality parts are produced, because they are handled fewer times;
- No modification is required to the presses for mounting the units; and
- Higher system uptime because there are fewer mechanisms.

The method and system of the present invention solves shortcomings of the system of FIGS. 2A and 2B by:
- Lower cost because fewer number of axes are used to transfer part;
- The unique combination of axes allows the robot to be mounted off to the side of the press line;
- The robot does not have to be physically removed from between the presses for die changeover;
- No tracks or slides required between presses;
- The time for die changeover is shortened, hence productivity is increased;
- Calibration of the robot program to new dies after changeover is quicker because the robot location is not disturbed;
- One less axis is required to achieve the same flexibility;
- The design allows for small torque motors;
- Lighter mechanism allows faster cycle time, hence high productivity; and
- Application specific custom designed wrists can be mounted to accommodate the die loading requirements of large sheet metal parts at a minimum of cost.

The invention has been described in an illustrative manner and, it is to be understood that the terminology which has been used is intended to be in the nature of words of description rather than of limitation.

Obviously, many modifications and variations of the present invention are possible in light of the above teachings. It is, therefore, to be understood that, within the scope of the appended claims, the invention may be practiced otherwise than as specifically described.

What is claimed is:

1. A system for quickly and efficiently transferring a workpiece from a first work station to a second work station along a substantially horizontal flow path, the system comprising:

an elevated support structure offset horizontally from the flow path;

a robot including a base mounted on the support structure and including an arm assembly pivotally supported proximal a first end of the arm assembly to swing about and below a substantially horizontal first axis adapted to be located above and between the first and second work stations, so that the arm assembly is capable of swinging like a pendulum between the first work station and the second work station about the first axis, the first axis being located in a vertical plane intersecting the flow path proximal a middle point of the flow path between the two work stations; and an end effector mounted on the arm assembly, wherein the arm assembly includes a first four-bar linkage pivotally connected to the base at the first axis and a second four-bar linkage pivotally connected to the first four-bar linkage to rotate about a substantially vertical second axis wherein the second axis intersects the first axis when the arm assembly is located in a substantially vertical position, said vertical position being locatable one-half of the distance between the first and second work stations, and at least part of the second linkage pivotally connected to rotate about a third axis, said third axis lies in a plane substantially orthogonal to the second axis.

2. The system as claimed in claim 1 further comprising a counterbalance mechanism attached to the arm assembly so that the amount of torque required to hold the arm assembly at each of the first and second work stations is substantially reduced.

3. The system as claimed in claim 1 or claim 2 wherein the arm assembly includes a first arm part pivotally connected to the base at one end of the first arm part to swing about the first axis, a platform pivotally connected to a second end of the first arm part and a second arm part pivotally connected at its ends to the base and the platform wherein the base, the first and second arm parts and the platform define the first four-bar linkage and wherein the platform is maintained in a substantially fixed orientation during swinging movement of the arm assembly.

4. The system as claimed in claim 3 wherein the arm assembly includes a connecting link pivotally connected to the platform to rotate about the second axis, a first link pivotally connected to the connecting link at one end of the first link and a support member pivotally connected to a second end of the first link wherein the first link is rotatable about the third axis to move the support member, and a second link pivotally connected at its ends to the connecting link and to the support member wherein the connecting link, the first and second links and the support member define the second four-bar linkage.

5. The system as claimed in claim 4 wherein the arm assembly includes a mounting part pivotally connected to the support member to rotate about a fourth axis to move the end effector in a plane.

6. The system as claimed in claim 5 further comprising a wrist mechanism for connecting the mounting part to the end effector, the wrist mechanism being rotatable about at least one wrist axis.

7. The system as claimed in claim 6 wherein the wrist mechanism is rotatable about a second wrist axis wherein the robot is capable of positioning and orienting the workpiece in a three-dimensional space with six degrees of freedom.

8. The system as claimed in claim 2 wherein the counterbalance mechanism is a cable-balancing device including a tension cable connected between the arm assembly and the supporting structure for supporting the arm assembly.

9. The system as claimed in claim 8 wherein the cable balancing device includes a cylinder mounted on the support structure and connected to the cable for placing the cable under continuous tension to compensate for variations in effective cable lengths during swinging movement of the arm assembly from the first work station to the second work station.

10. The system as claimed in claim 9 wherein the cable balancing device includes a plurality of spaced pulleys interconnected by the cable, one of the plurality of pulleys being mounted on the cylinder and another one of the plurality of pulleys being mounted to one of the support structure and one of the work stations and wherein the cable extends between and over the plurality of pulleys.

11. A method for quickly and efficiently transferring a workpiece from a first work station to a second work station having a distance therebetween, the method comprising the steps of:

providing a support structure;

providing a robot including an arm assembly rotatable about first, second and third axes, the second axis being substantially orthogonal to the first axis and the third axis being substantially orthogonal to the second axis, the robot being supported on the support structure so that the arm assembly is located at a position above and between the first and second work stations, and so that the arm assembly is capable of swinging between the first work station and the second work station about and below the first axis;

providing an end effector on the arm assembly;

swinging the arm assembly about the first axis to the first work station;

utilizing the end effector to pick up the workpiece at the first work station;

swinging the arm assembly from the first work station to the second work station such that the force of gravity accelerates the arm assembly within a first half of the distance between the first and second work stations and decelerates the arm assembly within a second half of the distance, thereby allowing a quick and efficient transfer of the workpiece between the first and second work stations;

rotating the arm assembly about the second and third axes during the step of swinging the arm assembly from the first work station to the second work station to allow a center of gravity of the workpiece to follow a substantially straight line path between the first and second work stations wherein the second axis intersects the first axis when the arm assembly is located substantially one-half of the distance between the first and second work stations; and utilizing the end effector to place the workpiece at the second work station.

12. The method as claimed in claim 11 wherein at least one of the work stations includes a sheet metal press having a pair of opposing dies and wherein the workpiece is a sheet metal part.

13. The system as claimed in claim 3 wherein the substantially fixed orientation is generally horizontal.

14. The system as claimed in claim 4 wherein the first and second axes are orthogonal to one another.

15. The system as claimed in claim 14 wherein the second and third axes are orthogonal to one another.

16. The system as claimed in claim 5 wherein the third and fourth axes are orthogonal to one another.

17. The system as claimed in claim 6 wherein the at least one wrist axis is orthogonal to the fourth axis.

18. The system as claimed in claim 7 wherein the at least one wrist axis is orthogonal to the second wrist axis.

19. The system as claimed in claim 1 wherein the second axis is orthogonal to the first and third axes.

20. A system for quickly and efficiently transferring a workpiece from a first work station to a second work station along a straight line flow path, the system comprising:
 a support structure;
 a robot supported on the support structure and including an arm assembly having a first and second linkages, the first linkage being pivotally supported proximal the first end of the arm assembly to swing about and below a first axis adapted to be located above and between the first and second work stations, and the second linkage being supported on the first linkage to rotate about second and third axes, the arm assembly being capable of swinging between the first work station and the second work station about the first axis wherein gravitational force is utilized to at least partially drive the first linkage between the first work station and the second work station in a plane that is offset from and parallel to the flow path wherein the second axis intersects the first axis when the first linkage is substantially midway along the flow path; and
 an end effector supported on a second end of the arm assembly distal the first axis and adapted to pick up the workpiece at the first work station and adapted to place the workpiece at the second work station.

21. A system for quickly and efficiently transferring a workpiece from a first work station to a second work station, the system comprising:
 a support structure;
 a robot supported on the support structure and including an arm assembly pivotally supported proximal the first end of the arm assembly to swing about and below a first axis adapted to be located above and between the first and second work stations, the arm assembly including two independently actuated linkages which are relatively rotatable about second and third axes and which are adapted to swing between the first work station and the second work station about the first axis wherein gravitational force is utilized to at least partially drive the workpiece between the first work station and the second work station wherein movement of one of the linkages relative to the other linkage about the third axis is adapted to compensate for any height difference between the first and second work stations so that the workpiece follows a path that approximates a straight line between the first and second work stations and wherein the second axis intersects the first axis when the arm assembly is substantially midway along the path; and
 an end effector supported on a second end of the arm assembly distal the first axis and adapted to pick up the workpiece at the first work station and adapted to place the workpiece at the second work station.

22. A system for quickly and efficiently transferring a workpiece from a first work station to a second work station along a substantially horizontal flow path, the system comprising:
 an elevated support structure offset horizontally from the flow path;
 a robot including a base mounted on the support structure and including an arm assembly pivotally supported proximal a first end of the arm assembly to swing about a first axis, wherein the first axis is located in a substantially vertical position, said vertical position being locatable above and between the first and second work stations in a vertical plane intersecting the flow path proximal a middle point between the two work stations;
 an end effector mounted on the arm assembly wherein the arm assembly includes a first four bar linkage pivotally connected to the base at the first axis and further includes a second four bar linkage pivotally connected to the first four bar linkage to rotate about a substantially vertical second axis and at least part of the second four bar linkage pivotally connected to rotate about a third axis which lies in a plane substantially orthogonal to the second axis.

23. A system for quickly and efficiently transferring a workpiece from a first work station to a second work station along a substantially horizontal flow path, the system comprising:
 an elevated support structure offset horizontally from the flow path;
 a robot including a first four bar linkage having a base link mounted on the support structure in a substantially vertical position, said vertical position being locatable above and between the first and second work stations, a first transport link substantially equal in length to the length of the base link, and two control links of substantially equal lengths pivotally connected to the base link and the first transport link to swing below the base link about a set of substantially horizontal axes including a first axis located at the base link in a vertical plane locatable so as to intersect the flow path proximal a middle point between the first and second work stations, a platform link pivotally connected to the first transport link to rotate about a substantially vertical second axis, a second transport link, and two height compensating links pivotally connected to both the platform link and the second transport link to form a second four bar linkage having a set of parallel pivotal axes including a third axis which lies in a plane which is substantially horizontal and orthogonal to the second axis; and
 an end effector mounted on the second transport link and adapted to pick up the workpiece at the first work station and adapted to place the workpiece at the second work station.

24. A system for quickly and efficiently transferring a workpiece from a first work station to a second work station along a substantially horizontal flow path intersecting a median plane orthogonally proximal a middle point of the flow path, the system comprising:
 an elevated support structure offset horizontally in the medial plane from the flow path;
 a robot including a base link mounted on the support structure in a substantially vertical position, said vertical position being locatable above and between the first and second work stations, a first transport link connected to the base link by means of two first control links to form a first parallel four bar mechanism having a first set of substantially horizontal pivotal axes adapted to be located between the first and second work stations, a second transport link, a platform link pivotally connected to the first transport link about a substantially vertical second axis and connected to the second transport link by means of two second control links to form a second parallel four bar mechanism having a second set of substantially horizontal pivotal axes, said base link being substantially parallel to the flow path; and an end effector mounted on the second transport link and adapted to pick up the workpiece at the first work station and adapted to place the workpiece at the second work station.

25. The system of claim 24 further comprising a gravity counterbalance mechanism attached to the robot.

26. The system of claim 24 wherein the end effector is pivotally supported on the second transport link to rotate about a substantially vertical third axis in a substantially horizontal plane.

27. The system of claim 25 wherein the end effector is pivotally supported on the second transport link to rotate about a substantially vertical third axis in a substantially horizontal plane.

28. The system as claimed in claims 24, 25, 26 or 27, further comprising a multi-axis wrist mechanism for connecting the end effector to the second transport link hence allowing the system to pick up and place the workpiece in multiple orientations.

29. A method for quickly and efficiently transferring a workpiece from a first work station to a second work station having a generally horizontal transfer path therebetween, the method comprising the steps of:

providing an elevated support structure at a location offset perpendicularly and horizontally from the transfer path and between the first and second work stations;

providing a robot having links independently rotatable about first, second, and third axes by means of first, second, and third axis actuators, respectively; the first axis being substantially horizontal and substantially perpendicular to the transfer path, and adapted to be located above and between the first and second work stations; the second axis being substantially vertical and rotatable about the first axis; and the third axis being substantially horizontal and rotatable about the second axis, hence, providing the robot with three generally independent degrees of freedom; the robot being pivotally supported on the elevated support structure to swing about and below the first axis so as to reciprocate between the first and the second work stations;

providing the robot with an end effector;

rotating the robot about the first axis under power of the first axis actuator to move the robot to the first work station thereby initiating a workpiece transfer cycle;

stopping the robot momentarily at the first work station;

utilizing the end effector to pick up the workpiece at the first work station; and swinging the robot from the first work station to the second work station so that the force of gravity accelerates the robot within a first half of the distance between the first and second work stations and decelerates the robot within a second half of the distance, thereby minimizing the energy spent by the first axis actuator and allowing quick and efficient transfer of the workpiece between the first and second work stations;

stopping the robot momentarily at the second work station;

utilizing the end effector to place the workpiece at the second work station;

swinging the robot from the second work station to the first work station thus allowing the robot to begin a new transfer cycle.

30. The method of claim 29 further comprising the step of:

actuating the second and third axis actuators during the step of swinging the robot from the first work station to the second work station to allow a center of gravity of the workpiece to follow a substantially straight line path between the first and second work stations.

31. The method of claims 29 or 30 further comprising the steps of:

providing the robot with a gravitational balancing device actuable by robot program commands; and actuating the gravitational balancing device during the steps of rotating and stopping to conserve the power of the first axis actuator for exerting higher acceleration on the workpiece during the steps of swinging, hence allowing quicker and more efficient transfer of the workpiece from the first work station to the second work station.

* * * * *